Nov. 27, 1928.

O. A. DONATH 1,693,073

EXPLOSION MOTOR

Filed Oct. 27, 1923   5 Sheets-Sheet 1

INVENTOR
O. A. Donath

ATTORNEY

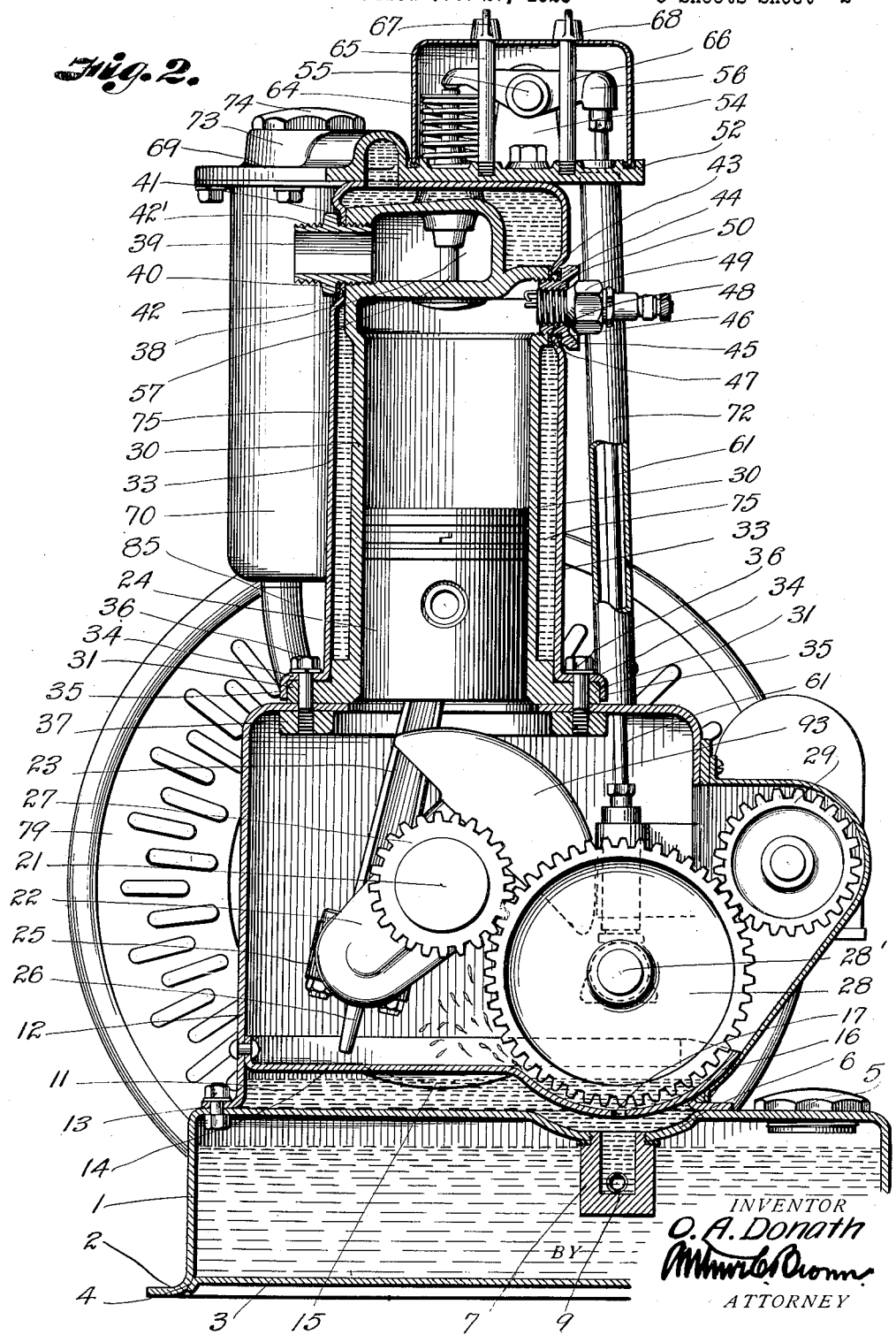

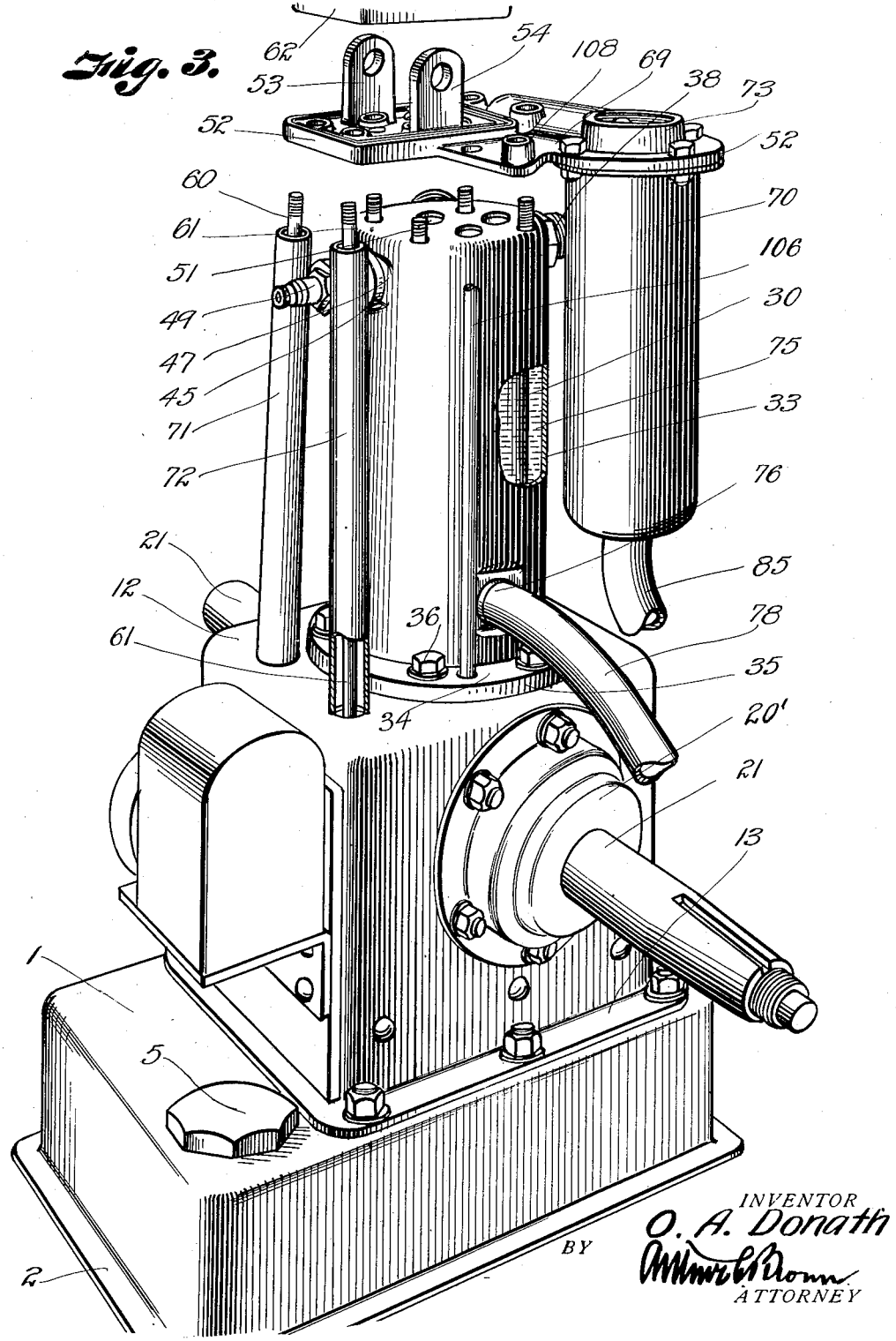

Nov. 27, 1928.
O. A. DONATH
EXPLOSION MOTOR
Filed Oct. 27, 1923     5 Sheets-Sheet 4
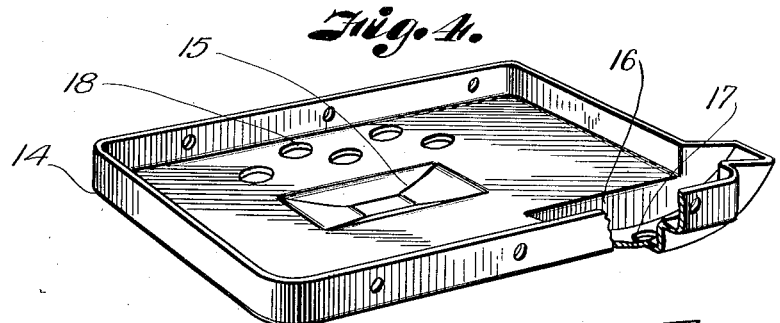
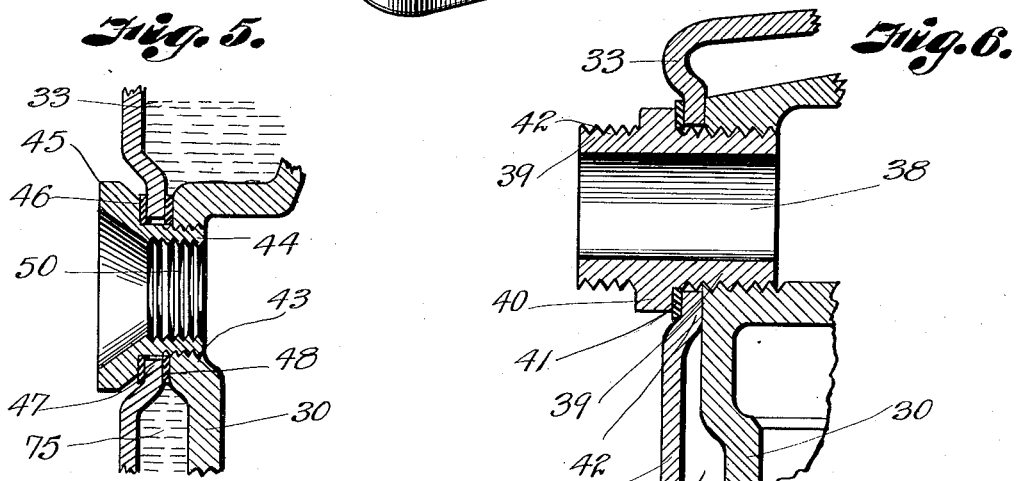
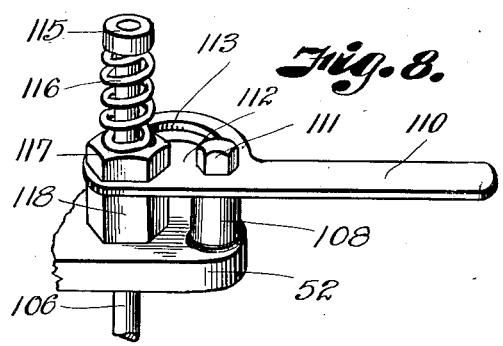
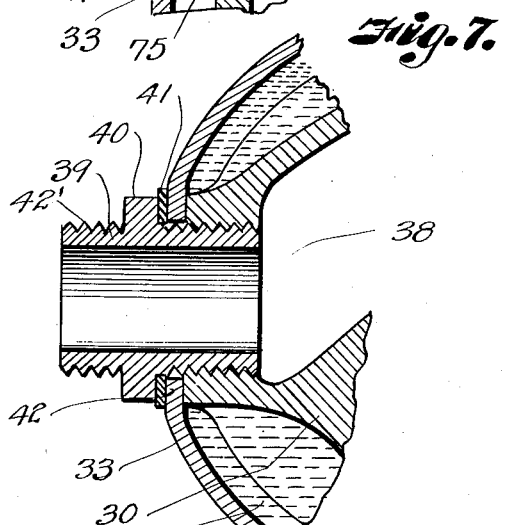
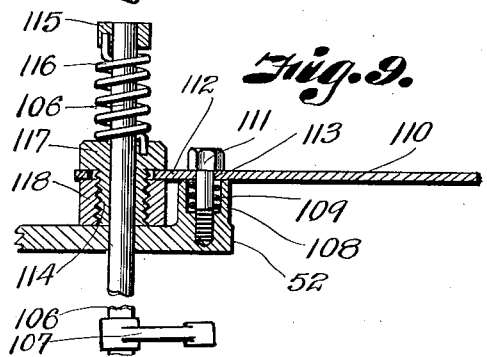
INVENTOR
O. A. Donath.
BY
ATTORNEY

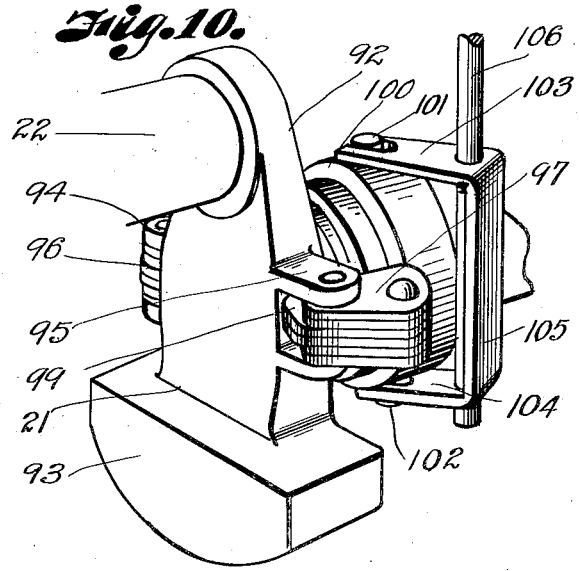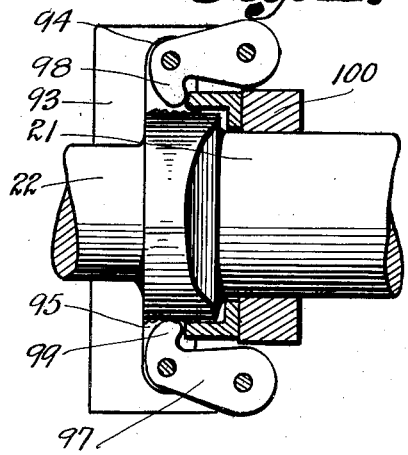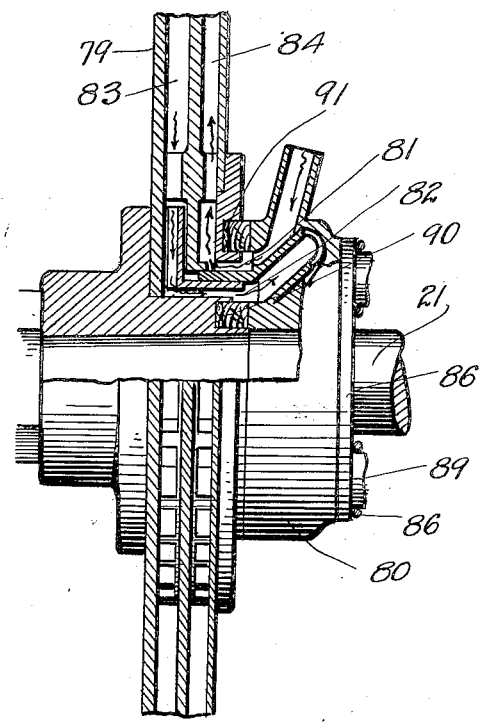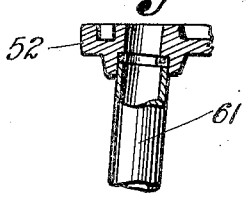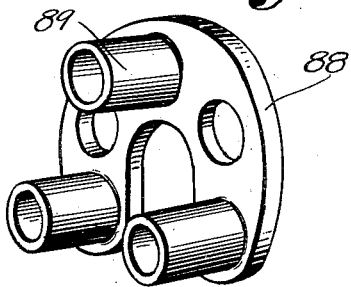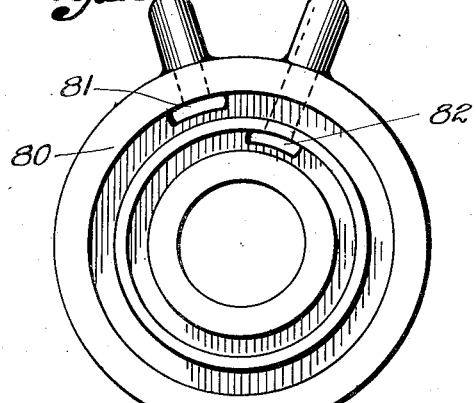

Patented Nov. 27, 1928.

1,693,073

UNITED STATES PATENT OFFICE.

OTTO A. DONATH, OF CLINTON, IOWA, ASSIGNOR TO O. D. COLLIS OF CLINTON, IOWA.

EXPLOSION MOTOR.

Application filed October 27, 1923. Serial No. 671,110

This invention relates to explosion engines and the primary object of the invention is to simplify the construction so as to reduce the cost of production and to this end I utilize stampings instead of castings wherever expedient because the stampings are less expensive and can be more readily produced in large quantities than castings. Another advantage is that the stampings can be made in separate parts and assembled in a very convenient manner by riveting or welding, the cost of the rivets being, obviously, less than the cost of bolts and similar fastening devices which would be necessary in the event that castings were used.

In adapting the engine construction to the use of castings I have been able to make certain novel improvements in the construction and all of these will be referred to hereinafter, reference being had to the accompanying drawings, in which Fig. 1 is a vertical, longitudinal, sectional view through an engine constructed in accordance with my invention.

Fig. 2 is a vertical, longitudinal, sectional view at right angles to the plane of the view shown in Fig. 1.

Fig. 3 is a perspective view of the engine partly dismantled.

Fig. 4 is a detail, perspective view of the bottom of floor of the crank case.

Fig. 5 is a sectional view through the spark plug opening.

Fig. 6 is a vertical, sectional view through the intake or exhaust opening, these being duplicates.

Fig. 7 is a cross sectional view through either the intake or exhaust opening.

Fig. 8 is a detail, perspective view of the governor control lever.

Fig. 9 is a vertical, sectional view through the governor control lever.

Fig. 10 is a detail perspective view of the governor.

Fig. 11 is a top view of the governor.

Fig. 12 is a detail, perspective view of the jam plate for the inlet manifold.

Fig. 13 is an end view of the inlet and outlet manifold.

Fig. 14 is a vertical, cross sectional view through the cooling radiator, and

Fig. 15 is a fragmentary sectional view of part of the cap plate showing one of the valve rod tubes connected to it.

Figure 1:
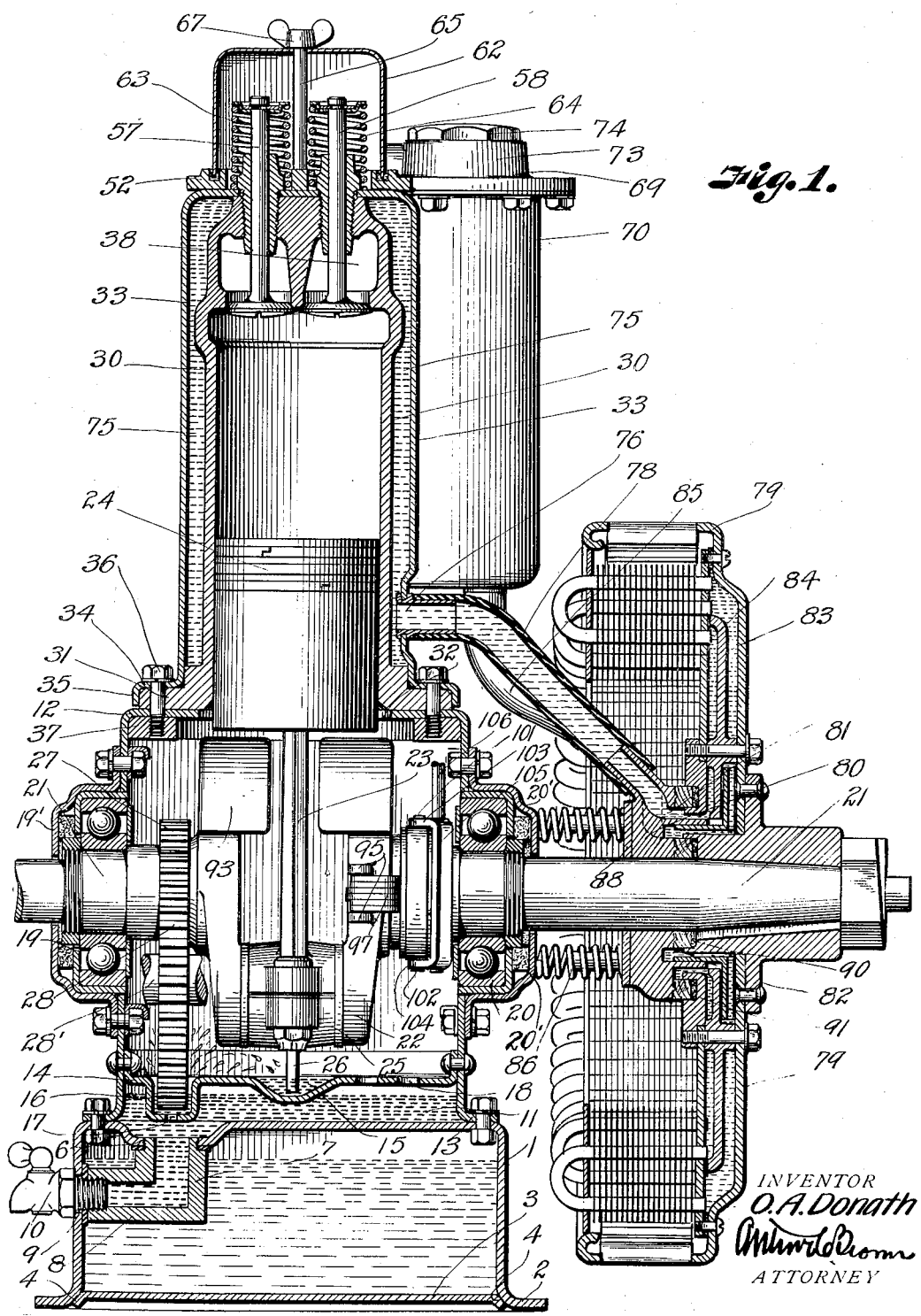

The base of the engine consists of two metal stampings. The stamping 1 has a top with a circumferential side flange projecting downwardly and terminating in an outwardly extending lip 2. At the juncture of the lip with the circumferential side flange is a sheet floor plate 3, welded at 4 so that the members 1 and 3 constitute a tank into which oil may be introduced for storage purposes, the tank having an opening closed by a plug 5. In the top of the base is a depression or sump 6, having a central opening therein into which may be threaded an elbow pipe 7, the lateral arm 8 of which is opposite an opening 9 in the side flange of the base. The end of the lateral arm receives a draw-off cock 10 by means of which oil may be drawn from the oil chamber 11 above the base.

The oil chamber 11 above the base is formed by the crank case 12, which is also a stamping having a lateral lip 13 at its lower edge bolted to the top of the base 1. The crank case 12 is an inverted cup-shaped stamping and fastened to its vertical wall in spaced relation with the top of the base is an oil pan or partition 14, having a sump or depression 15 in its middle, there being a depression or trough 16 at one corner of the pan 14 with a central inlet opening 17 and in the floor of the pan are outlet openings 18.

The floor of the trough-shaped depression 16 is submerged in the oil in the oil chamber 11 so that there will always be oil in the trough provided the level of the oil in the chamber 11 is maintained. The oil is fed into the crank case by a gear which works in the trough, as will be explained hereinafter. It might be well to state here, however, that the oil is splashed by the teeth of the gear from the trough onto the pan where it will accumulate in the sump 15 to form a pool through which the splash projection on the crank shaft will distribute it over the moving parts of the engine. The accumulated oil in the sump 15 will overflow into the pan and flow back into the chamber 11 through the ports 18.

Journaled in bearings 19 and 20 in the crank case is a crank shaft 21, carrying a crank 22 to which the piston rod 23 is mounted. The piston rod 23 is connected to a piston 24 in an appropriate manner.

The crank rod connection 25 carries a splash projection 26 which will move through the pool of oil in the sump to throw the oil over the moving parts of the engine in a wall understood manner.

On the crank shaft 24 is a pinion 27, meshing with the cam shaft gear 28 which, in turn, meshes with the magneto gear 29 also mounted on a shaft in the crank case. The cam shaft gear 28 is the intermediate large gear, the teeth of which pass through the pool of oil in the trough 16 and it is this gear which functions as a pump for throwing the oil into the pan 14 to supply the oil into the crank case for lubricating purposes.

The engine cylinder 30 is a casting having at its lower end an outwardly extending flange 31 which rests upon the top of the crank case surrounding the central opening 32 through which the piston rod extends. A water jacket comprising a stamping 33 covers the cylinder and it is provided at its lower end with a flange 34 having a depending lip 35 which fits over the flange 31 of the cylinder. The jacket and the cylinder are fastened to the crank case by bolts 36, which extend through the flanges of the cylinder and the jacket and extend through the crank case, the lower threaded ends of the bolts being secured to a ring 37 within the crank case.

The water jacket is provided with depressions at the point of intake and exhaust for the engine. Only one of these is shown in Figs. 6 and 7 because the intake and exhaust connections are duplicate. The connection will be described as the intake as, for example, 38 in Fig. 2. The intake chamber 38 receives a nipple 39 having a collar 40 preferably aligned with a washer 41 which bears against the flat recessed portion 42 of the water jacket so that when the nipple is screwed into place, the wall of the water jacket will be forced tightly against the cylinder to prevent leakage of water from the water jacket either into the intake or to the outside of the engine. The intake manifold can be fastened to the end 42' of the nipple.

A similar nipple is provided for the exhaust so it is thought to be unnecessary to illustrate the connection for the exhaust.

The spark plug opening 43 (Fig. 5) receives a threaded nipple 44 which is provided with a collar 45 lined with a washer 46 to bear against the flattened portion 47 of the water jacket and if desired a packing washer 48 may be placed between the wall of the water jacket and the cylinder so that when the nipple is screwed in place, there will be a tight connection at this point. The spark plug 49 may be screwed into the internally threaded port 50 of the nipple 44.

Projecting from the top of the water jacket are stud bolts 51, which pass through openings in the cap plate 52 which constitutes the floor of the hood of the engine. The cap plate 52 has upwardly extending bearing projections 53 and 54, in which is mounted a rocking lever shaft 55 on which the rocking levers 56 are mounted. The rocking levers constitute valve levers for operating the valves 57 and 58 in the usual way. The levers are actuated from the cam shaft 28', on which the cam gear 28 is mounted, through the medium of the rods 60 and 61.

The cap plate carries a cup-shaped stamping 62, which encloses the valve levers and the valve stem as well as the springs 63 and 64. The hood is removably secured to the cap plate by the studs 65 and 66, carried by the cap plate and having at their upper ends wing nuts 67 and 68. The cap plate has an extension 69 which constitutes a cover for the water reservoir 70. The water reservoir contains the supply of water for the cooling jacket, as will be explained hereinafter.

The extension 69 is also provided with openings through which the valve operating rods 60 and 61 extend. The rods 60 and 61 are protected by tubular jackets 71 and 72. The upper ends of the tubular jackets 71 and 72 abut against the under side of the cap plate 52 and the lower ends against the top of the crank case and they surround openings large enough to permit oil vapor from the crank case to pass through them into the hood so as to lubricate moving parts in the hood of the engine.

It will be seen that the cap plate 52 which is a casting may be formed of a single piece to constitute both the floor of the hood and a cover for the water reservoir. The extension 69 or that portion of it which constitutes a cover for the reservoir 70 is provided with an opening surrounded by a threaded flange 73, adapted to be closed by a plug 74 (see Figs. 1, 2 and 3) so that by moving the cap 74, the supply of water in the reservoir 70 can be replenished, as the occasion may demand.

The space 75 between the water jacket and the cylinder is provided with an inlet 76, having a tubular connection 78 with a fly wheel radiator 79, discharging into the manifold 80 through the port 81 and exhausting through the port 82 so that the water can pass through the chambers 83 and return through 84, exhausting through 82 into the reservoir 70 through the connection 85.

The generic form of the radiator fly wheel is old in a known type of engine so I do not claim any novelty for the general application of a radiator fly wheel but the peculiar construction of the manifold 80 appears to be novel and it is shown in detail in Fig. 13. The manifold can be forced into engagement with the fly wheel by the springs 86 bearing against the bearing box 87 on the crank case and against the jam plate 88 which is forced against the manifold 80. The studs 89 on the jam plate form supports for the springs 86. The manifold 80 can, therefore, be yieldingly forced into the fly wheel against the packings 90 and 91.

The crank shaft 21 carries the crank 22, on which is a counter-balance weight 93. The crank 92 has two sets of outwardly projecting studs 94 on one side and 95 on the other. These carry fly weights 96 and 97 which are pivoted to the studs and each fly weight has a hook 98 and 99 respectively which engage the edge of a collar 100 sleeved on the shaft. The collar 100 is adapted to move longitudinally of the shaft but it does not rotate with it.

The collar 100 is provided with studs 101 and 102 at diametrically opposite points which engage the bifurcated ends 103 and 104 of a yoke 105 to which is fastened a throttle valve rod 106 which operates an arm 107 (see Fig. 9) connected to the throttle. The throttle is not shown as it is of usual construction.

The weights 96 and 97 are made up of laminations bolted together. This I find an advantageous way of making the weights because the laminations can be stamped out and since they are made of stampings from metal of uniform gauge, they will have a uniform weight. This is not true of cast weights because cast weights frequently have air holes or voids in them which cause their weights to vary. However, a stamped sheet of uniform gauge will invariably have uniform weight and given area; therefore, I find it much less expensive to form the weights of laminated stampings than of castings.

I have provided means whereby the speed of the engine can be varied. In order to provide for this I prefer to employ the mechanism shown in Figs. 8 and 9. On the cap plate is a recessed lug 108, in which is a spring 109 bearing against a lever arm 110 pivoted to the cap plate by the bolt 111, the spring exerting frictional compression against the lever arm 110. The lever arm has a head 112 with an arcuate slot 113 in it, the head of the bolt working in the slot. The throttle valve rod 106 extends through a threaded bolt 114 on the cap plate and is provided at its upper end with a fixed collar 115. There is a spring 116 coiled about the upper end of the throttle valve stem and one end of the spring rigidly engages the collar 115 and the other rigidly engages the nut 114. The head of the lever arm 110 is clamped between the lower face of the head 117 of the nut 114 and a jam nut 118 (see Figs. 8 and 9).

The two nuts 114 and 118 are loose on the throttle valve rod 106 so that when the lever arm 110 is swung about the axis of the throttle valve rod, it can vary the tension of the spring 116 and, therefore, vary the speed at which the governor will function to operate the throttle valve. The lever will be held in any adjusted position by the friction spring 109.

It will be apparent that when the engine is operating, the oil will be fed or circulated through the bottom of the crank case so that there will be an adequate supply of lubricant for the splash system and that the vapors caused by the operation of the splash system and the heat of the motor can conveniently pass up through the tubes 71 and 72 into the hood of the engine to lubricate the moving parts in the hood, the tubes forming a tight connection between the top of the crank case and the bottom of the cap plate 52. A connection between the tube and the cap plate is illustrated in detail in Fig. 15. The water will circulate from the water jacket through the radiator back to the water reservoir 70 and from there to the water jacket again in a manner well understood in connection with a well known type of engine. Indeed, the novelty is claimed for the construction of the engine as to type but the invention resides rather in the details of construction by which the engine can be produced at a minimum cost by utilizing stampings wherever practical and by so constructing these stampings that the assembly of the parts of the engine can be quickly accomplished.

What I claim and desire to secure by Letters Patent is:

1. In an engine comprising a supporting base, an inverted cup-shaped stamping secured to the top of said base to form a crank case, a crank shaft mounted in the crank case and a cam shaft gear engaged with said shaft, a sheet metal floor secured to said stamping in spaced relation to the top of said base to form an oil reservoir, said floor having downwardly struck depressions therein forming oil retaining recesses receiving the periphery of said cam shaft gear and, one of said recesses having an inlet opening connecting with said oil reservoir.

2. In an engine comprising a supporting base, an inverted cup-shaped stamping secured to the top of said base to form a crank case, and a sheet metal floor secured to said stamping in spaced relation to the top of said base to form therewith an oil reservoir, said floor having downwardly struck depressions therein forming oil retaining recesses, a pipe mounted within the base and having a port adjacent one of said recesses for delivery of oil to the reservoir, said distinguished recess having an inlet opening connecting with said oil reservoir, the raised portion of said floor having oil outlets therein.

In testimony whereof I affix my signature.

OTTO A. DONATH.